April 27, 1926.
C. C. BALDWIN
AGRICULTURAL MACHINE
Original Filed Oct. 18, 1920   3 Sheets-Sheet 1

1,582,660

Inventor:
Curtis C. Baldwin,
by Wallace R. Lane.
Atty.

April 27, 1926. 1,582,660
C. C. BALDWIN
AGRICULTURAL MACHINE
Original Filed Oct. 18, 1920  3 Sheets-Sheet 3

Inventor:
Curtis C. Baldwin,
by Wallace R. Lane.
Atty.

Patented Apr. 27, 1926.

1,582,660

UNITED STATES PATENT OFFICE.

CURTIS C. BALDWIN, OF LA PORTE, INDIANA, ASSIGNOR TO ADVANCE RUMELY COMPANY, OF LA PORTE, INDIANA, A CORPORATION OF INDIANA.

AGRICULTURAL MACHINE.

Original application filed October 18, 1920, Serial No. 417,644. Divided and this application filed December 22, 1922. Serial No. 608,417.

*To all whom it may concern:*

Be it known that I, CURTIS C. BALDWIN, a citizen of the United States, residing in the city and county of La Porte, State of Indiana, have invented a new and useful Improvement in Agricultural Machines, of which the following is a specification.

The present invention relates to agricultural implements having automatically operated cutting and threshing mechanism, and has reference more particularly to the means for separating the chaff, dust and similar substances from the grain and the plant stocks, such as straw.

This application is a division of my copending application, Serial No. 417,644, filed October 18th, 1920, for automatically operating power actuated combined grain cutting and threshing harvester.

Among the objects of the invention is to provide a device of the nature above stated comprising threshing means and means for receiving the threshed material from the threshing means, together with means for blowing a stream of air transversely through the path of movement of the threshed material from the threshing means to the receiving means; with the blowing means between the threshing and receiving means, and preferably beneath the path of movement of the material from the threshing to the receiving means; with a blowing means on one side and an exhaust means on the other side of the path of movement of the material, preferably locating the blowing means, such as an air force pump beneath, and the exhausting means, such as an exhaust pump, above, the path of movement of the material; with a discharge nozzle or ejecting means on the blowing means directed, preferably upwards, toward the path of movement of the material for forcing a stream of air transversely therethrough, with an intake on the exhaust pump on the other side of the path of movement of the material, and co-operating with the blowing means, preferably the nozzle thereof, for forcing the air through the material moving from the threshing to the receiving means, said nozzle and intake being preferably in alignment with each other; and to provide other objects advantages and capabilities, as will later more fully appear, and are inherently possessed by the invention.

Figure 1:
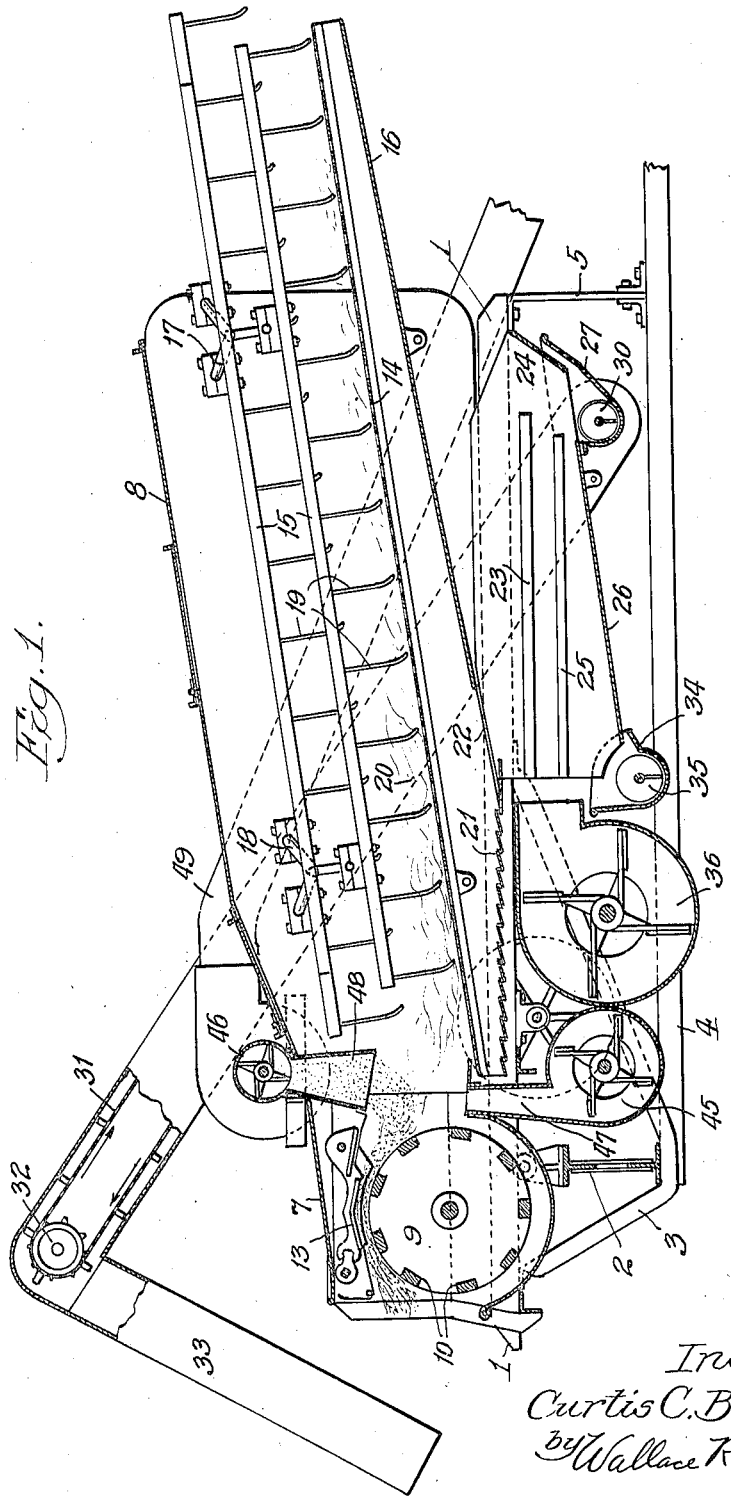
Figure 2:
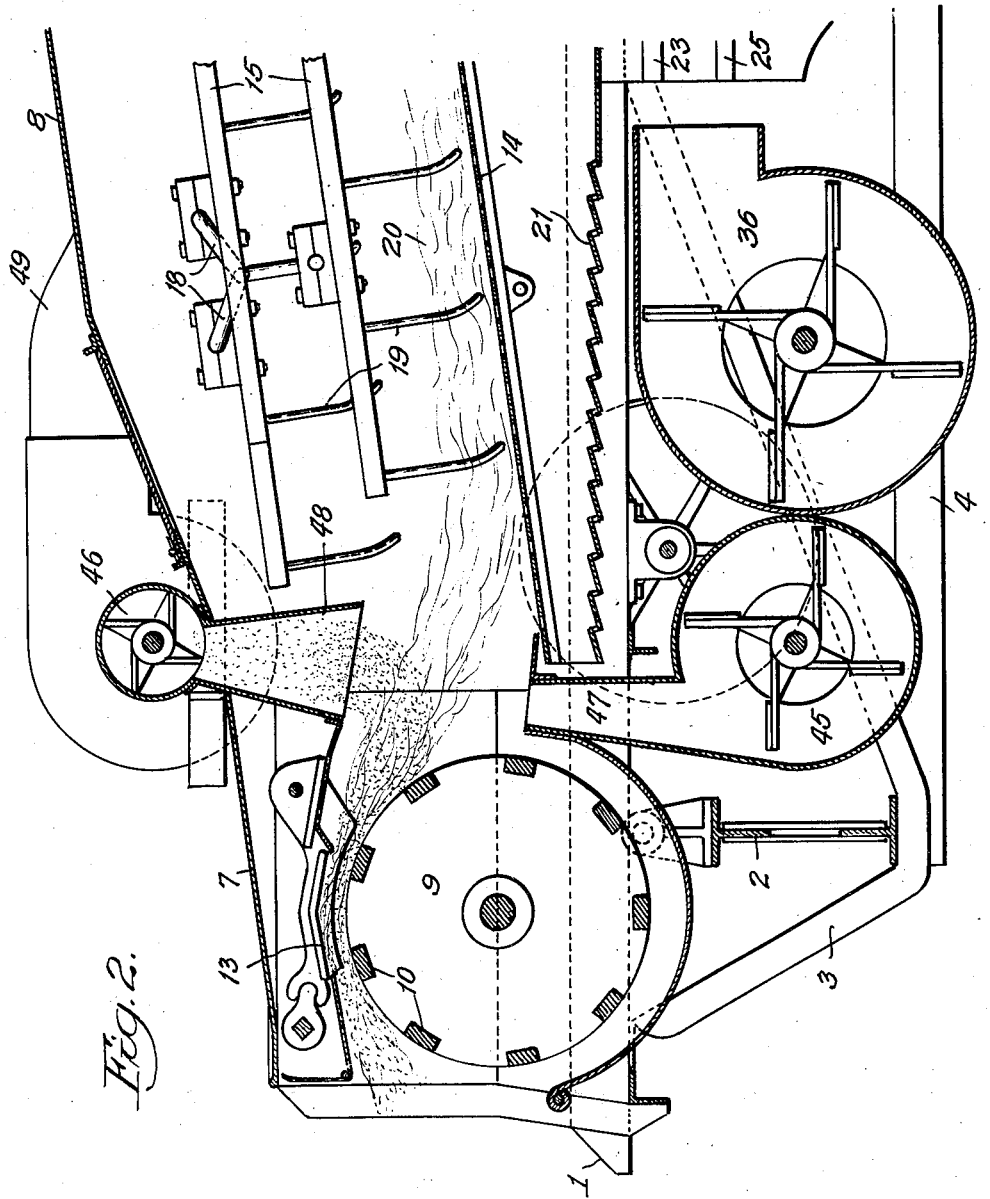
Figure 3:
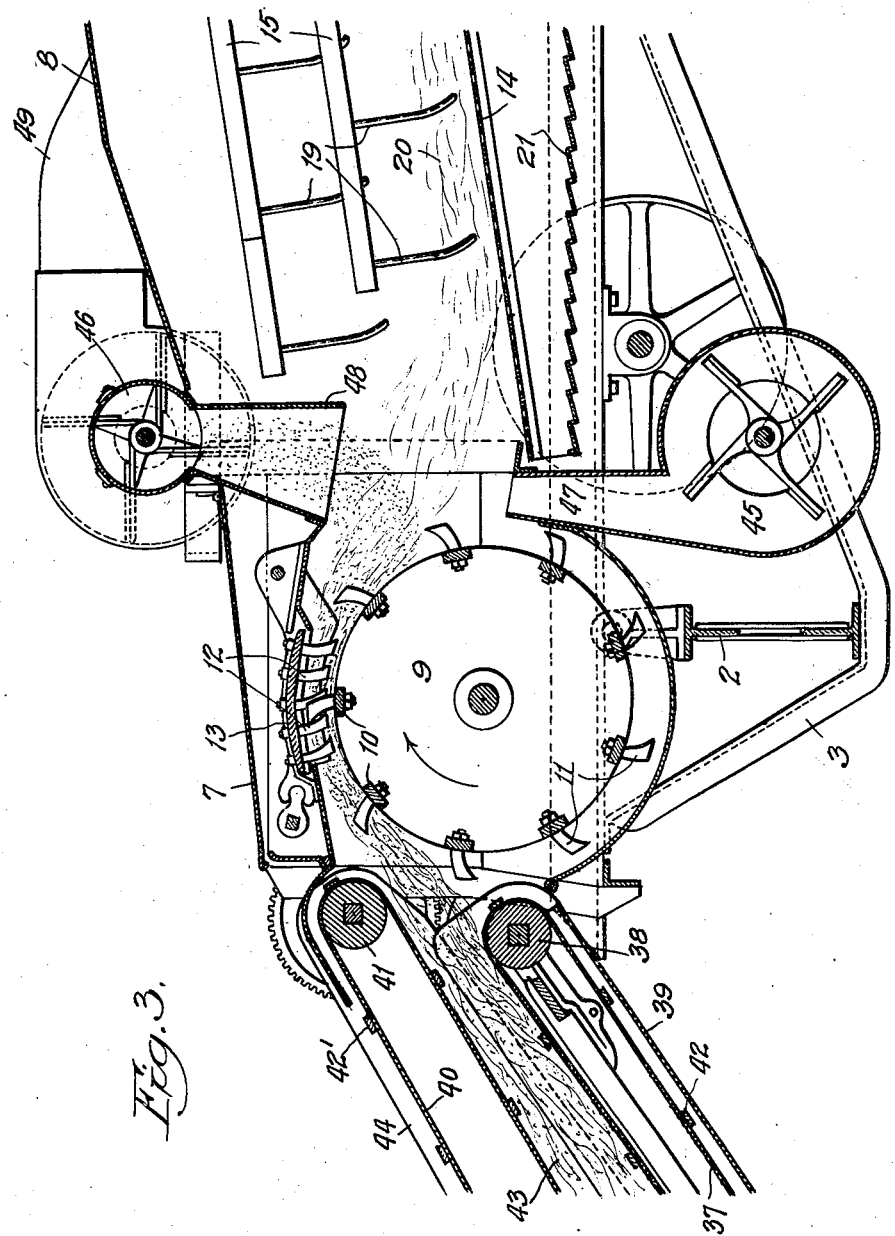

In the drawings illustrating preferred forms of the invention, Fig. 1 is a longitudinal sectional view through a threshing machine, embodying the invention; Fig. 2 is a similar view of part of the mechanism on an enlarged scale, and Fig. 3 is a like view of a different form of mechanism.

Referring more particularly to the drawing, the invention is shown in connection with a threshing machine supported upon longitudinal bars or supporting members 1, resting at their forward ends upon an axle 2, constructed of suitable structural members to form an axle for both the tractor and harvesting machine or thresher, the axle 2 being common to both. To the axle 2 are connected brace members 3 adapted to aid in supporting the threshing mechanism as well as bracing its parts. To the lowest side of the axle 2 is also connected a brace member 4 which extends diagonally rearwardly to the rear end of the frame or chassis of the tractor (not shown). The rear end of the supporting members 1 are connected to the brace member 4 by connecting member 5.

The threshing mechanism comprises a cylinder housing 7, and a receiving or shaker housing 8, both preferably of sheet metal and suitable secured to and supported upon the supporting members 1. Within the cylinder housing 7 is rotatably supported a threshing cylinder 9 having a number of bars 10, each carrying a number of threshing projections 11 (see Fig. 3) adapted to co-operate with teeth 12 fast to a stationary concave member 13 in the upper part of the cylinder housing, as clearly shown in Fig. 3 of the drawing. In the housing 8 is located a shaker comprising a perforated bottom portion 14, rakes 15 and a grain receiving plate 16. The rakes are supported upon crank shafts 17 and 18, which rotate, to give the rake an up and down, as well as a rearward motion, so that the teeth 19 of the rakes intermittently move the material 20 rearwardly and upwardly to the rear end of the threshing mechanism, where the straw is discharged upon the ground or in a suitable cart to be carried away. The shaker constitutes a receiving means for the threshed material as the latter is thrown from the cylinder 9 upon the plate 14. The shaker mechanism in general, including the plate 14, is suitably connected to appropriate cams or the like, through suitable links, for giving the shaker a reciprocating motion, so as to continually shake or disturb the material on the plate 14, so that the grain kernels and seeds may be shaken loose from the straw and work their way through the perforations in the plate 14, and drop upon the plate 16, the latter being inclined so that they will find their way downwardly to the lower end of the plate 16. Some of the grain kernels or seeds will also pass through perforations near the lower end of the plate 14 and fall upon corrugated plates 21, which is also connected to a cam motion and shaken to cause the grains or seeds to work rearwardly and fall through an opening 22 provided between the rear end of the plate 21 and the forward lower end of the plate 16, the grains and seeds falling upon a perforated plate 23 located in the riddle box 24. Beneath the plate 23 is also located another perforated plate 25 of finer mesh than the plate 23, so that the grains and seeds of finer size may pass through the plate 25 and fall upon the inclined plate 26.

The plates 23 and 25 are also connected to suitable agitating means, so that the grain may be made to progress over the top of the plates 23 and 25 toward the rear end thereof, and the grain kernels and seeds that have not passed through the mesh of the plates will drop into a hopper 27 in which is rotatably located an auger or screw conveyor 30, capable of forcing the material received in the hopper 27 to an endless conveyor 31, passing over pulleys 32 and capable of carrying the coarser grain received to a chute 33, where the material may be discharged upon the material moving from the sickle mechanism to the thrashing cylinder, for re-threshing the same together with newly fed material.

The grain and seeds that fall through the grate or plate 25 upon the plate 26 will be conducted to another hopper 34, in which is also located an auger or screw 35, capable of feeding the received grain to another conveyor (not shown), capable of delivering the grains and seeds to a suitable receiver, such as a wagon or cart. At the forward end of the riddle box may be located a blower 36 capable of blowing a stream of air through the riddle box 24 to remove from the seeds and grain kernels any loose pieces of straw, chaff and dust that may have been carried down with them, and blowing the same rearwardly out of the machine into the air.

At the forward end of the machine is supported a sickle mechanism (not shown), such mechanism also carrying suitable means for receiving the cut grain and conveying the same to the threshing cylinder. This structure includes an endless conveyor belt or apron 37 passing over the driven rollers 38 and suitably supported in housing member 39. Above the belt 37 is also a second belt or apron 40, supported in housing members 44, and passing over roller 41, so that the under side of the belt 40 travels upwardly at the same rate as the upper side of the belt 37 travels, the material delivered by the sickle mechanism passing in the space between these two portions of these aprons. The aprons are provided with transverse strips 42 and 42' for aiding in forcing or carrying the material into the cylinder housing 7.

Between the threshing mechanism including the thrashing cylinder, and the receiving mechanism including the shaker, are located a pair of pumps, or blowers, 45 and 46, the former being located beneath the path of movement of the material from the threshing cylinder to the receiving means or shaker, and the exhaust pump 46 being located above. The blower may be of any suitable form, and preferably has a nozzle 47 tapering upwardly, and the exhaust pump 46, also may be of any suitable form, and preferably has a downwardly extending flared intake portion 48 in alignment with the nozzle 47. The outward end of the nozzle and the inlet end of the intake are disposed on opposite sides of the stream or path of movement of the material from the threshing cylinder 9 to the receiving means or shaker 16. A blast or stream of air is blown from the pump 45 to the nozzle 47 through the stream of material passing from the threshing mechanism to the receiving mechanism and removes the chaff, dust and other particles therefrom toward the intake 48. The latter also co-acts with the nozzle to draw in the chaff, dust and like particles so that the rotary part of the blower or pump may force the same into a chute 49, which ultimately discharges the chaff, dust and other particles to the rear of the threshing mechanism. It will be noted that the stream of air blowing the chaff and similar material from the threshing mechanism is directed transversely through the stream of material being ejected from the threshing cylinder 9 and passing therefrom into the threshing mechanism, where the straw and loose grain kernels and seeds are received upon the plate 14. Were the chaff removing stream of air directed along the path of movement of the threshed material or substantially therewith, the chaff would not be so readily removed. By having the stream of air blowing directly across or transversely of the path of movement of the threshed material, and also including an exhaust pump or blower, the chaff, dust and other substances of like nature are more efficiently and readily removed without effecting the movement of the threshed material into the receiving means minus such chaff, dust and the like.

It is to be understood that the various mechanisms of the threshing machine are operated and driven by suitable driving connections including belts, etc., connected to the power unit of the tractor, the tractor being part of the threshing mechanism, but not being shown here, inasmuch as it does not form part of the invention claimed in this application. Any part of the threshed material not being completely separated from the grain kernels and seeds and which still need to be treated again, are carried from the plate 23 into the hopper 27 and then into the chute 33, where it is again delivered upon the apron 37, whereby it passes with the rest of the material into the threshing cylinder, acted upon therewith, for further separation of the grain kernels and seeds.

While I have herein described and shown upon the drawing a few embodiments of my invention, it is to be understood that the invention is not limited to the particular construction, details and arrangement of parts shown and described, but that other constructions, details and arrangements of parts are comprehended by the invention, without departing from the spirit thereof.

Having now described my invention, I claim:—

1. An agricultural machine comprising threshing means, means for receiving the threshed material, and means located adjacent the exit of the threshing means and at opposite sides of the path of movement of the threshed material issuing from the exit of the threshing means, said means causing the movement of a stream of air transversely through said issuing material for removing chaff, dust and similar substances therefrom before the material arrives at the receiving means.

2. An agricultural machine comprising threshing means having an exit opening, means for receiving the threshed material, blowing and drawing means located adjacent to and at opposite sides of said exit opening and operating to effect the movement of a stream of air across the path of movement of the threshed material as it issues from the exit opening of the threshing means for removing chaff, dust and like substances therefrom.

3. An agricultural machine comprising threshing means having an exit opening, means for receiving the threshed material, a blower located adjacent said exit opening and beneath the path of movement of the threshed material issuing therefrom for blowing a stream of air transversely through the material moving from the threshing means whereby the chaff, dust and similar substances are removed from said material, and means located in alinement with said blowing means for withdrawing the chaff blown from the material.

4. An agricultural machine comprising threshing means, means for receiving the threshed material, blowing means on one side and exhausting means on the other side of the path of movement of the material from the threshing to the receiving means, for causing a movement of air transversely through said material while moving from the threshing to the receiving means, whereby the chaff, dust and like substances are removed from said material.

5. An agricultural machine comprising threshing means, means for receiving the threshed material, a blower beneath and an exhaust device above the path of movement of the material from the threshing to the receiving means, said blower and device co-operating to force a stream of air transversely through said material while moving from the threshing to the receiving means, whereby the chaff, dust and like substances are removed from said material.

6. An agricultural machine, comprising threshing means, means for receiving the threshed material, a blower having a discharge nozzle directed upwardly toward the path of movement of the material from the threshing to the receiving means for forcing a stream of air transversely through said material while moving from the threshing to the receiving means, whereby the chaff, dust and like substances are removed from said material, and means for withdrawing the blown chaff.

7. An agricultural machine comprising threshing means, means for receiving the threshed material, a blower having a discharge nozzle directed upwardly toward the path of movement of the material from the threshing to the receiving means, for forcing a stream of air transversely through said material while moving from the threshing to the receiving means whereby the chaff, dust and like substances are removed from said material, and means for withdrawing the blown chaff.

8. An agricultural machine comprising threshing means, means for receiving the threshed material, a blower having a discharge nozzle directed upwardly toward the path of movement of the material from the threshing to the receiving means, and an exhaust device having an intake on the opposite side of said path of movement of said material for forcing a stream of air transversely through said material while moving from the threshing to the receiving means whereby the chaff, dust and like substances are removed from said material.

9. An agricultural machine comprising threshing means, means for receiving the threshed material, pneumatic chaff removing means comprising an air ejecting means on one side, and an air exhausting means on the other side of the path of movement of the material from the threshing to the receiving means, and being in alignment with each other, for forcing a stream of air transversely through said material, whereby the chaff, dust and like substances are removed from said material.

10. An agricultural machine comprising threshing means, means for receiving the threshed material, pneumatic chaff removing means comprising an air blower having an upwardly directed discharge nozzle and an exhaust device having an intake directed toward said nozzle and being in alignment therewith, said blower, device, threshing and receiving means, being so arranged that the threshed material moving from the threshing to the receiving means passes transversely between said nozzle and intake.

11. An agricultural machine comprising threshing means, means for receiving the threshed material, an air blower having an upwardly directed tapering discharge nozzle, and an exhaust pump having a downwardly directed flared intake, said nozzle and intake being in alignment and being located on opposite sides of the path of movement of the threshed material from the threshing to the receiving means, whereby a stream of air passes from said nozzle to said intake transversely through the path of movement of said material.

12. An agricultural device of the class disclosed, comprising a threshing device and a separator for receiving the threshed material from the threshing device, a chaff removing device located adjacent the thresher and the path of movement of the threshed material as it is cast from the threshing device, said chaff removing device having a blower and an exhauster located on opposite sides of the path of movement of the threshed material, whereby a stream of air from the blower to the exhauster removes the chaff, dust and like substances from the straw and grain before the latter reaches the separator.

13. A method of removing chaff from grain, consisting of the steps of threshing the grain in a threshing means having an exit opening, projecting the threshed material through said opening, and simultaneously blowing and drawing a stream of air through the material as it issues from said opening for blowing the chaff out of the material.

14. A method of removing chaff from grain, consisting of the steps of threshing the grain in a threshing means having an exit opening, projecting the threshed material through said opening, blowing the chaff transversely out of the material as it issues from said opening, withdrawing said chaff as it is blown from said material, and then separating the grain or seeds from the chaff free straw.

In witness whereof, I hereunto subscribe my name to this specification.

CURTIS C. BALDWIN.